(12) United States Patent
Lox et al.

(10) Patent No.: US 6,238,525 B1
(45) Date of Patent: May 29, 2001

(54) PROCESS FOR REDUCING THE NITROGEN OXIDES CONTENT OF EXHAUST GAS FROM AN INTERNAL COMBUSTION ENGINE

(75) Inventors: Egbert Lox, Hanau; Jürgen Gieshoff, Biebergemünd; Wolfgang Strehlau, Grosskrotzenburg; Thomas Kreuzer, Karben, all of (DE)

(73) Assignee: Degussa-Hüls Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/299,630

(22) Filed: Apr. 27, 1999

(30) Foreign Application Priority Data

Apr. 30, 1998 (DE) ............................................. 198 19 372

(51) Int. Cl.$^7$ ........................... C01B 21/00; C01B 21/30
(52) U.S. Cl. ............................................. 204/177; 204/179
(58) Field of Search .................................. 204/179, 164, 204/177; 422/186, 186.04

(56) References Cited

U.S. PATENT DOCUMENTS

| | | |
|---|---|---|
| 3,983,021 | 9/1976 | Henis . |
| 5,043,311 | * 8/1991 | Engler et al. ..................... 502/439 |
| 5,711,147 | * 1/1998 | Vogtlin et al. ..................... 60/274 |
| 5,746,984 | * 5/1998 | Hoard ................................. 422/169 |
| 5,782,085 | 7/1998 | Steinwandel ....................... 60/274 |
| 6,001,318 | * 12/1999 | Tillaart et al. ..................... 423/212 |
| 6,038,853 | * 3/2000 | Penetrante et al. ............ 422/186.03 |
| 6,038,854 | * 3/2000 | Penetrante et al. ............ 422/186.03 |

FOREIGN PATENT DOCUMENTS

| | | |
|---|---|---|
| 195 10 804 | 9/1996 | (DE) . |
| 0562516 | 9/1993 | (EP) . |
| 0659465 | 6/1995 | (EP) . |
| 0736320 | 10/1996 | (EP) . |
| WO 96/37690 | 11/1996 | (WO) . |
| WO 97/03746 | 2/1997 | (WO) . |
| WO 98/00221 | 1/1998 | (WO) . |
| WO 98/02233 | 1/1998 | (WO) . |

OTHER PUBLICATIONS

English Abstract of Japanese Publication No. 06269635 to Mitsubishi Heavy Ind. Ltd., dated Sep. 27, 1994.

* cited by examiner

Primary Examiner—Kathryn Gorgos
Assistant Examiner—Thao Tran
(74) Attorney, Agent, or Firm—Smith, Gambrell & Russell, LLP

(57) ABSTRACT

A process for reducing the nitrogen oxides content of the exhaust gas from an internal combustion engine includes treating the exhaust gas in an electric gas discharge such that at least one of nitrogen dioxide or nitric acid are formed from nitrogen oxides in the exhaust gas; storing the nitrogen dioxides and/or the nitric acid in the form of nitrates on a nitrogen oxides storage material during phases when the engine operates with a greater than a stoichiometric air/fuel ratio (i.e., the storage phase); decomposing the nitrates to give nitrogen oxides during brief phases when the engine operates with a less than the stoichiometric air/fuel ratio (i.e., the desorption phase); and reducing the nitrogen oxides which are released from the storage material to nitrogen. The nitrogen oxides storage material may be located in an electric gas discharge zone, and the exhaust gas may be passed through the discharge and then over the storage material.

19 Claims, 6 Drawing Sheets

PROCESS FOR REDUCING THE NITROGEN OXIDES CONTENT OF EXHAUST GAS FROM AN INTERNAL COMBUSTION ENGINE

BACKGROUND OF THE INVENTION

The present invention relates to a process for reducing the nitrogen oxides content of the exhaust gas from an internal combustion engine by storing the nitrogen oxides in the form of nitrates on a storage catalyst during phases when the engine operates with a greater than stoichiometric air/fuel ratio, decomposing the nitrates to give nitrogen oxides during phases when the engine operates with a less than stoichiometric air/fuel ratio, and reducing the nitrogen oxides which are released.

Processes like this are used to treat the exhaust gases from internal combustion engines, which are mainly operated with a greater than stoichiometric air/fuel ratio. These are diesel engines and lean burn petrol engines, in particular petrol engines with direct injection of the petrol.

The air/fuel ratio for stoichiometric combustion depends on the composition of the fuel. Conventional engine fuels have a stoichiometric air/fuel ratio of about 14.6, that is 14.6 kg of air are required for complete combustion of 1 kg of fuel. The internal combustion engines mentioned above are operated with air/fuel ratios of greater than 16 during most of their operating period. The so-called "normalized air/fuel ratio" or "λ" is often used to describe the composition of the exhaust gas instead of the air/fuel ratio. This ratio λ is the air/fuel ratio normalized to the stoichiometric ratio. An exhaust gas with a stoichiometric composition, therefore, has a normalized air/fuel ratio of 1. Rich exhaust gas compositions have values less than 1, and lean exhaust gas compositions have values greater than 1.

The harmful substances in the exhaust gas from these engines consist substantially of carbon monoxide, unburnt hydrocarbons, and nitrogen oxides. The nitrogen oxides consist mainly of nitrogen monoxide and nitrogen dioxide, wherein nitrogen monoxide, depending on the operating phase of the engine, makes up the major component of about 90 vol. %. As a result of operating with an above stoichiometric composition, the exhaust gas contains a high proportion of oxygen, generally more than 6 vol. %. In addition, the exhaust gas also contains about 10 to 15 vol. % of water.

Due to the high oxygen content, the oxidizable constituents of the exhaust gas (carbon monoxide and hydrocarbons) can relatively easily be converted to harmless water and carbon dioxide using so-called oxidation catalysts. In contrast, reduction of the nitrogen oxides presents great difficulties due to the high oxygen content and the low selectivity of the reaction of nitrogen oxides with the hydrocarbons and carbon monoxide acting as reducing agents.

One possibility, converting the nitrogen oxides in the oxygen-rich exhaust gas to harmless nitrogen, comprises using the process described at the beginning. An essential component of the process is a nitrogen oxides storage catalyst, or a "storage catalyst," for short. This storage catalyst consists mainly of a basic storage material, generally alkali metal or alkaline earth metal oxides, and a catalytically active noble metal from the platinum group of metals (i.e., ruthenium, rhodium, palladium, osmium, iridium, and platinum). Platinum is preferably used, this metal having the highest activity of all the noble metals for the production of $NO_2$.

During above stoichiometric operation of the internal combustion engine, the nitrogen monoxide contained in the exhaust gas is oxidized to nitrogen dioxide by the noble metal in the catalyst and is stored in the form of nitrates by the basic storage material. The rate of absorption of nitrogen oxides decreases with time due to saturation of the storage material, so a regeneration procedure has to be initiated. For this purpose, the engine is switched to below stoichiometric operation (enrichment of the fuel/air mixture) for a brief period by the engine electronics system, which produces an overall reducing gas atmosphere over the nitrogen oxides storage catalyst. The nitrates are then decomposed to give nitrogen oxides, which are desorbed from the storage material and converted into harmless nitrogen on the noble metal component of the catalyst, with the assistance of the carbon monoxide, hydrocarbons, and hydrogen, which are then present in excess in the exhaust gas. Suitable storage catalysts are described, for example, in EP 0 562 516 A1, which document is entirely incorporated herein by reference. A mixed oxide of barium oxide and lanthanum oxide is used as the storage material in this patent application. The catalytically active component in this case is platinum.

In addition to the technique using storage catalysts described above, plasma-supported treatment processes have been developed recently. Along these lines, EP 0 659 465 A2 describes a process for treating exhaust gases in which the gas is subjected to an electric gas discharge and is contacted with catalytic material. The gas discharge preferably takes place in a region that contains catalytic material. EP 0 659 465 A2 is entirely incorporated herein by reference.

EP 0 736 320 A1 describes a process for the continuous removal of nitrogen oxides in exhaust gases from internal combustion engines with excess oxygen, wherein a reactive, nitrogen-containing plasma-jet is injected into the exhaust gas stream. The plasma-jet is produced by high frequency electromagnetic fields. EP 0 736 320 A1 also is entirely incorporated herein by reference.

Another process for treating exhaust gases with the assistance of electric discharges is described in WO 96/37690, which document is entirely incorporated herein by reference. In this process, the exhaust gas flows through a discharge chamber with an electric field in which dielectric discharges (barrier discharges) are produced.

WO 97/03746 discloses a process for the plasma-chemical decomposition and/or destruction of harmful substances, wherein the harmful substances, such as an exhaust gas stream, are passed through a section in a reactor volume that is subject to dielectrically impeded ("silent") discharges. Discharge takes place in a three-dimensional structure in which the entire reactor volume is divided in the axial direction into discharge zones and discharge-free zones, wherein local field peaks are present in the discharge zones, which leads to an increase in the effective electronic energy during discharge. WO 97/03746 also is entirely incorporated herein by reference.

DE 195 10 804 A1 describes a process for nitrogen oxides reduction in exhaust gases from internal combustion engines with excess oxygen, wherein the exhaust gases are brought into contact with a catalyst while introducing a selective gaseous reducing agent. In the process described in this patent document, the reducing agent is converted into a high pressure plasma state with extensive radical production before entering into contact on the catalyst, so that the reaction is accelerated. DE 195 10 804 A1 is entirely incorporated herein by reference.

WO 98/00221 describes an exhaust gas treatment unit including a storage device for nitrogen oxides, hydrocarbon, and particle emissions from an internal combustion process, and a plasma reactor for decomposing the stored emissions. The storage device may be arranged completely upstream from or overlapping with the plasma reactor or fully inside the plasma reactor. The harmful substance emissions mentioned above are collected for a certain period and then decomposed in the plasma reactor. The plasma reactor is operated only during the release phase for the harmful substances in order to avoid the production of unwanted nitrogen dioxide and nitric acid and to minimize the energy consumption associated with operating the plasma reactor. WO 98/00221 also is entirely incorporated herein by reference.

The processes described for the treatment of exhaust gases sometimes have considerable problems and shortcomings. For example, in the case of a storage catalyst, the surface stability of the platinum used presents problems after high temperature ageing, in particular in a lean exhaust gas. In addition, oxidation of nitrogen monoxide to nitrogen dioxide starts only in the temperature range between 150 and 200° C. and shifts to higher temperatures after thermal ageing of the catalyst. A reasonable conversion of nitrogen oxides with the assistance of a storage catalyst is possible only to a limited extent with diesel vehicles at the low exhaust gas temperatures that are produced under urban driving conditions.

The purification processes using electric gas discharges discussed above also have not hitherto led to the desired result. Measurements of the effects of an electric gas discharge on the oxidized nitrogen components in a nitrogen oxides-containing lean exhaust gas show, in fact, that although a high proportion of nitrogen monoxide is reduced to almost zero by the discharge, higher oxidized nitrogen components are produced, such as nitrogen dioxide and also, due to reaction with the water in the exhaust gas, nitric acid. An overall reduction in the oxidized nitrogen components cannot therefore be observed.

SUMMARY OF THE INVENTION

The object of the present invention is to provide a process for reducing the amount of nitrogen oxides in exhaust gases from internal combustion engines by using a nitrogen oxides storage catalyst that has an increased ageing stability and makes the use of platinum largely superfluous or enables platinum to be replaced by another active component, such as palladium, copper, manganese, or another metal. In addition, an object of the invention is to provide a process as described above that additionally has an improved low temperature activity, even below 150° C.

These objects are achieved by a process for reducing the amount of nitrogen oxides in exhaust gases from an internal combustion engine by: storing the nitrogen oxides in the form of nitrates on a nitrogen oxides storage material during phases when the engine operates with a greater than stoichiometric air/fuel ratio (i.e., a storage phase); decomposing the nitrates to give nitrogen oxides during brief phases when the engine operates with a less than stoichiometric air/fuel ratio (i.e., a desorption phase); and reducing the nitrogen oxides which are released from the storage material during the desorption phase. The process is characterized in that the exhaust gases are treated in an electric gas discharge prior to and/or during the storage phase, and the nitrogen dioxide and/or nitric acid produced during electric gas discharge treatment are stored on the nitrogen oxides storage material until the desorption phase.

The storage materials chosen for storing nitrogen oxides are basic materials that bond nitrogen oxides in the form of nitrates. In contrast to the conventional use of storage catalysts in which platinum takes on the important task of producing nitrogen dioxide, in principle the process according to the invention uses no noble metal components during the storage phase (under oxidizing exhaust gas conditions). The electric gas discharge takes over the production of nitrogen dioxide. The production of nitric acid, which is not observed in conventional processes, is also of special importance in the process of the invention. The rate of reaction of nitric acid with the basic storage materials to give nitrates is higher than the rate of reaction of nitrogen dioxide. Thus, there is an increase in efficiency during the storage of oxidized nitrogen components in the form of nitrates.

In addition, the production of nitrogen dioxide and nitric acid takes place in the electric discharge even in the low temperature region below 150° C., so that the storage of nitrogen oxides starts during the cold start phase.

BRIEF DESCRIPTION OF THE DRAWINGS

The invention will be explained in more detail below in conjunction with the attached figures, wherein.

DETAILED DESCRIPTION OF THE INVENTION

A variety of gas discharges may be used for treating exhaust gases. For the purposes of the invention, so-called "dielectric barrier discharges" are particularly suitable.

A barrier discharge may be produced between two metallic electrodes, at least one of which is coated with a dielectric material that prevents a direct discharge current between the two metallic electrodes.

Figure 1:
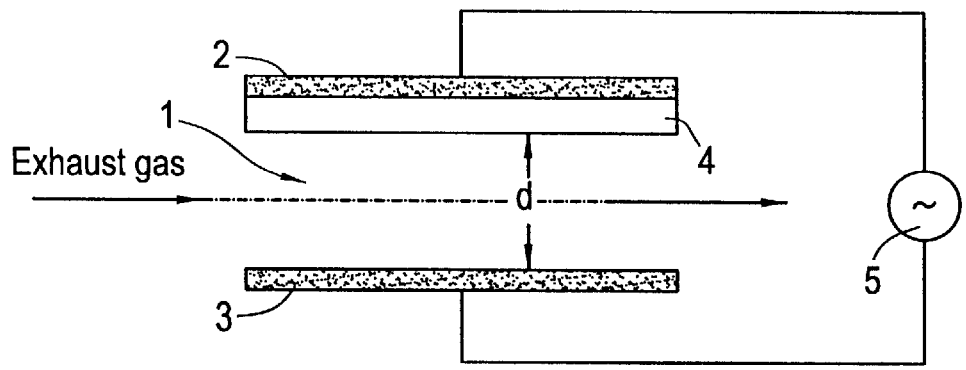
FIG. 1 illustrates an exhaust gas treatment system using a dielectric barrier discharge with parallel, flat electrodes, with dielectrically impeded discharge on one side.

FIG. 1 shows the main structure of such a discharge unit. Reference numbers 2 and 3 denote the two metallic electrodes, which face each other and are linked via a source of alternating voltage 5. In order to prevent a direct discharge current between the two electrodes 2 and 3, electrode 2 is covered (e.g., coated) with a dielectric material 4. This type of discharge is called "dielectrically impeded on one side." Any suitable dielectric material can be used without departing from the invention, such as quartz glass.

By applying an alternating voltage to the two electrodes 2 and 3, the required discharge takes place when the voltage is sufficiently high. The voltage required depends on the space "d" between the dielectric material 4 and the opposite electrode 3, and on the pressure in the discharge section 1. Distance d is preferably adjusted to be between 0.5 and 10 mm. The voltage required is then between about 5 and 15 kV. The frequency of the alternating voltage may be chosen to be between 50 Hz and 250 kHz.

Figure 2:
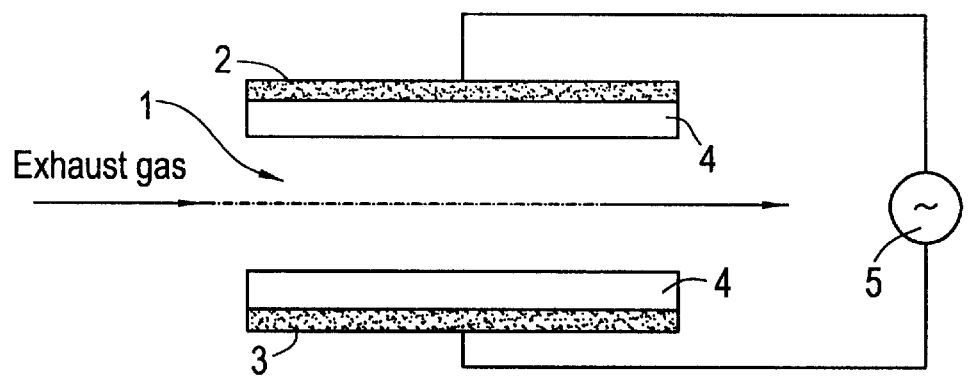
FIG. 2 illustrates an exhaust gas treatment system using a dielectric barrier discharge with parallel, flat electrodes, with dielectrically impeded discharge on both sides.
Figure 3:
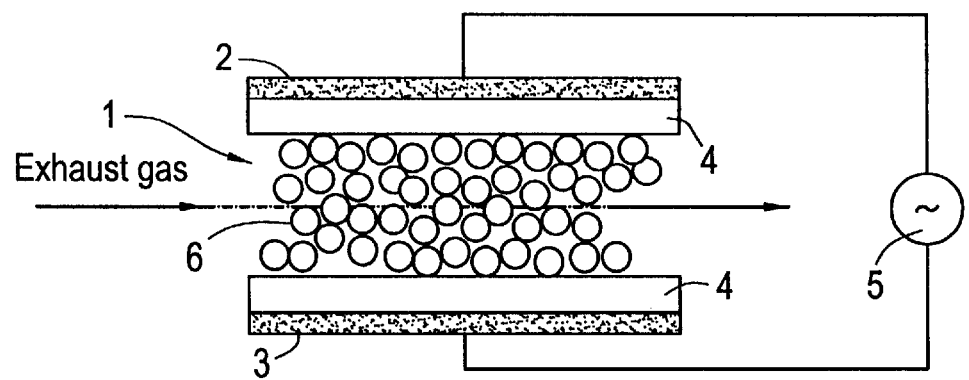
FIG. 3 illustrates an exhaust gas treatment system using a dielectric barrier discharge with parallel, flat electrodes, with dielectrically impeded discharge on both sides and with its discharge chamber filled with pellets.

FIG. 2 shows a variant of the layout in FIG. 1. In FIG. 2, both electrodes 2 and 3 are covered (e.g., coated) with a dielectric material 4. The dielectric material used on the two electrodes 2 and 3 may be the same or different. The gas discharge being produced in the discharge chamber 1 is then called "dielectrically impeded on both sides." In accordance with the discharge unit embodiment shown in FIG. 3, the discharge chamber 1 may be filled with packing material 6, but this material 6 should not exert or impose too large a resistance to the flow of the exhaust gas. The packing 6 in the discharge section 1 results in the discharge substantially running over the surface of the packing material 6. Higher power can be produced in the discharge in this way, which leads to improved conversion of the nitrogen oxides to nitrogen dioxide and nitric acid. The packing material 6, for example, pellets, may be spherical agglomerates or cylindrical or ring-shaped extrudates of any suitable packing material, such as alumina or another inert packing material. In principle, any of the shapes for pellets known from fixed-bed catalyst techniques are suitable for use in this embodiment of the invention. Those shapes are preferred which, as a bed, exhibit the lowest possible resistance to the flow of the exhaust gas and the highest possible geometric surface area.

The electrodes 2 and 3 may be constructed as two-dimensional structures that are aligned parallel to each other or may form a coaxial arrangement with a middle electrode that is surrounded by a tubular electrode. To facilitate the initiation of discharge filaments, three-dimensional inhomogeneities may be provided, which lead to local peaks in the field and thus to the initiation of discharge.

Figure 4:
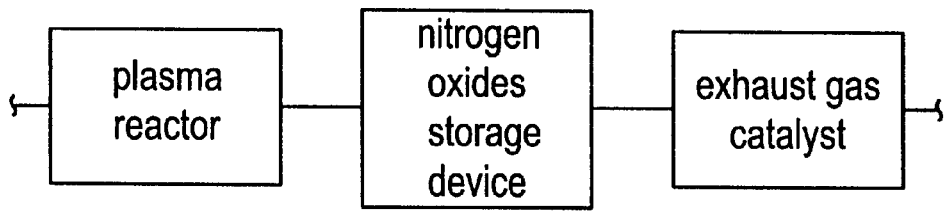
FIGS. 4–6 illustrate schematic diagrams of various different layouts for the plasma reactor in the exhaust gas treatment unit for an internal combustion engine according to the invention.
Figure 5:
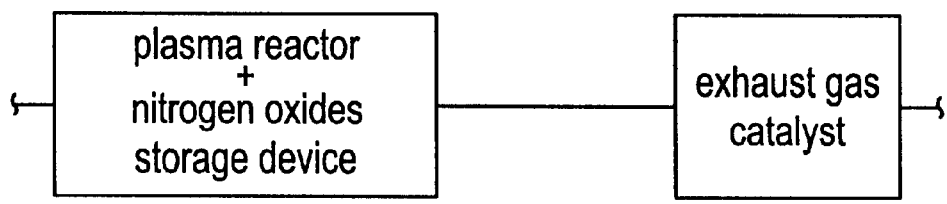
Figure 6:
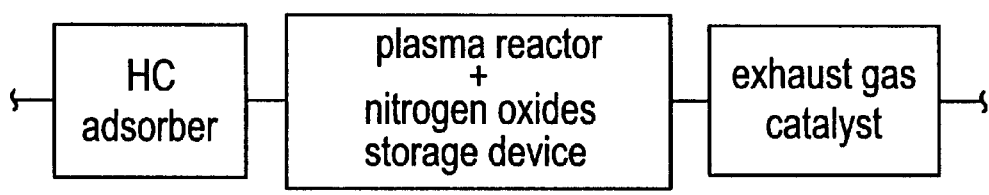

FIGS. 4 to 6 show different arrangements for the discharge section (also called the plasma reactor in the following) of the exhaust gas treatment unit for an internal combustion engine. According to FIG. 4, the plasma reactor is located upstream of the nitrogen oxides storage device. The nitrogen dioxide and nitric acid formed in the plasma reactor under lean exhaust gas conditions are passed over the nitrogen oxides storage device and react with its storage materials to give nitrates, which are then stored on the storage materials (i.e., the storage phase).

If the storage device has reached its storage capacity, then it has to be regenerated. This is achieved by lowering the normalized air/fuel ratio $\lambda$ of the exhaust gas to a value of less than 1. The stored nitrates are then decomposed and leave the nitrogen oxides storage device (i.e., the desorption phase). In order to react the nitrogen oxides with the reductive components in the enriched exhaust gas, an exhaust gas catalyst is built into the exhaust gas unit downstream of the nitrogen oxides storage device. Those skilled in the art will be able to readily determine the appropriate time period for this desorption phase (i.e., the time of operation with $\lambda<1$), as well as the appropriate time period between successive desorption phases, using routine experimentation. These time periods depend on various factors, including the physical characteristics of the system, such as the storage material composition, the storage material volume and/or surface area, the exhaust gas composition, the exhaust gas flow rate, the exhaust gas temperature, etc.

The barrier discharge may continue to operate even during the desorption phase. There is also the possibility, however, of discontinuing the barrier discharge during this phase, because the entire exhaust gas purification process is taken over by the downstream exhaust gas catalyst.

The arrangement shown in FIG. 4 may be modified by providing the nitrogen oxides storage material itself with at least one platinum group metal or with at least one metal from the first series of the transition metals (i.e., elements with the atomic numbers 21 to 30) in the periodic system of elements, as a catalytically active component. In this case, the nitrogen oxides storage material also has a catalytic capability. During the storage phase, the storage material supports the function of the plasma reactor by oxidizing nitrogen monoxide, which can emerge from the plasma reactor unchanged under some circumstances, to give nitrogen dioxide and then storing the same as a nitrate. During the desorption phase, this storage material can catalyze the reaction of the desorbed nitrogen oxides with the reductive components in the exhaust gas. In this modified arrangement, the downstream exhaust gas catalyst in FIG. 4 may optionally be dispensed with, depending on the size of the exhaust gas unit.

According to FIG. 5, the nitrogen oxides storage material may also be incorporated in the discharge chamber of the plasma reactor. This means that it is possible, as in the case of using an inert packing material, to produce a higher energy density in the discharge process. The nitrogen dioxide and nitric acid formed in the gas discharge are converted into nitrates and stored on the storage catalyst directly after production. Again, in this embodiment, an exhaust gas catalyst is located downstream of the nitrogen oxides storage material to convert the nitrogen oxides to nitrogen during the desorption phase.

In addition to, or as an alternative to, the exhaust gas catalyst, the storage material in this case also may be provided with catalytically active components from the platinum group and/or from the first series of transition metals in the periodic system of elements. These metals, on the one hand, support the action of the plasma during the storage phase, and on the other hand, reduce the released nitrogen oxides during the desorption phase. In particular, it is possible to design the nitrogen oxides storage catalyst as a combination of a conventional exhaust gas catalyst and the storage components. The amount of catalytically active noble metal present in the storage catalyst can be reduced due to the plasma support effect.

In order to improve exhaust gas treatment, a starter catalyst and/or a hydrocarbon adsorber may be inserted upstream of the plasma reactor (see FIG. 6). This has a positive effect on the light-off behavior with respect to exhaust gas treatment and suppresses hydrocarbon emissions during the cold start phase.

If the storage catalyst is inserted into the discharge chamber in the form of pellets, then access to a large part of the storage material in the interior of the pellets is difficult for the nitrogen oxides components and is only inadequately used. This situation can be improved if the storage material is applied as a coating to the internal walls of the flow channels of an inert support material in the form of a honeycomb. Any suitable inert honeycomb support material can be used, such as those conventionally used for automobile catalytic conversion catalysts (e.g., alumina, etc.).

Figure 7:
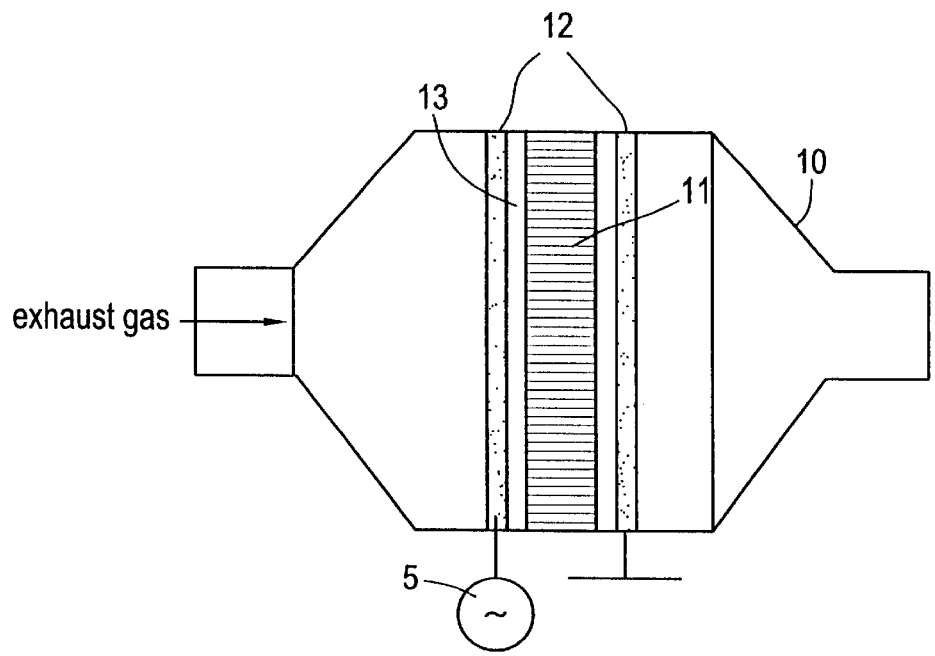
FIG. 7 illustrates a plasma reactor in the form of a honeycomb in a converter housing with axial guidance of the discharge for use in the process according to the invention.

FIG. 7 shows this kind of arrangement. The honeycomb structure 11 is built into a converter housing 10. As with conventional exhaust gas catalysts, the exhaust gas flows through the flow channels in the honeycomb structure 11. The electric gas discharge is also passed along and through the flow channels of this honeycomb structure 11. For this purpose, the end faces of the honeycomb structure 11 are provided with perforated, dielectric-coated discharge electrodes 12. Reference number 13 indicates the dielectric coating. One way of applying these types of electrodes 12 to the end faces of the honeycomb structure 11 includes, for example, coating the end faces with suitable layers by means of cathodic sputtering. Because the gas discharge is guided axially through the flow channels, only honeycomb structures with lengths of about 1 cm or less can realistically be used. Longer honeycomb structures would require too high a discharge voltage.

Figure 8:
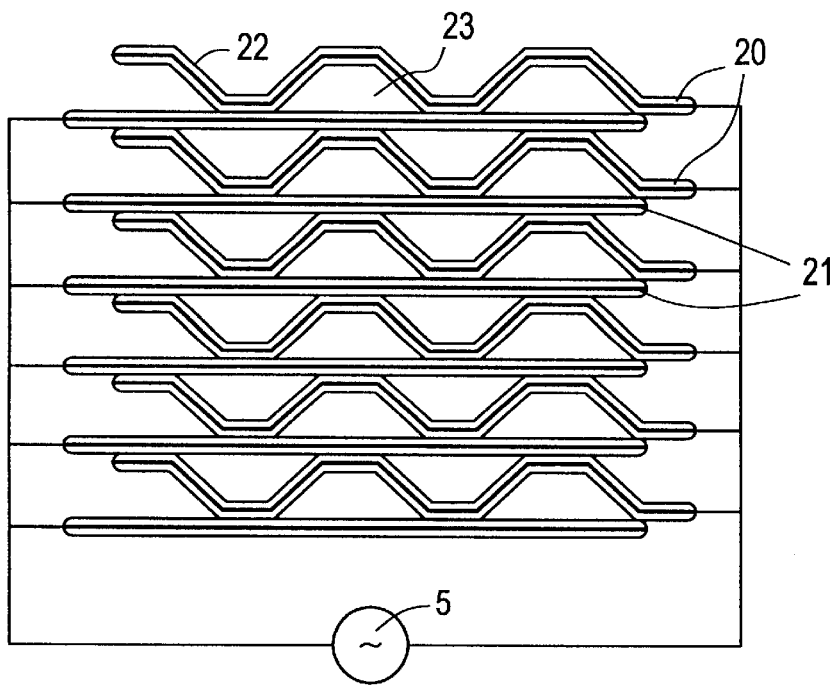
FIG. 8 illustrates a plasma reactor in the form of a metallic honeycomb structure with transverse guidance of the discharge for use in the process according to the invention.

The honeycomb structure shown in FIG. 8 does not have this restriction. FIG. 8 shows a cross-section through the honeycomb structure perpendicular to the flow channels 23 for the exhaust gas. The honeycomb structure includes alternating layers of plane metal foil 21 and corrugated metal foil 20, which foils 20 and 21 are coated on both sides with the nitrogen oxides storage material 22. The plane foil layers 21 are connected to one pole of the high voltage source 5 via a common electric circuit, and the corrugated foil layers 20 are connected to the second pole of the voltage source 5. By applying a voltage, an electric discharge takes place in each flow channel 23 transverse to the flow of the exhaust gas. The coating of nitrogen oxides storage material on the metal foils 20 and 21 acts as a dielectric medium and also takes over the electric isolation of two neighboring metal foils.

Due to the small cross-sectional dimensions of the flow channels, the discharge voltage may be chosen to be correspondingly low. In particular, the length of the honeycomb structure is not restricted in the same way as for the embodiment shown in FIG. 7. Corrugated and plane metal foil layers 20 and 21 are combined with each other in FIG. 8 and form a foil stack. Two different types of corrugated metal foils, however, may also be combined with each other. The type of corrugation and the cross-sectional dimensions of the flow channels may be adapted to the particular requirements of an application.

If the coating of storage material 22 on the metal foils 20 and 21 is not able to assume the function of a dielectric barrier, there is the possibility of introducing a dielectric intermediate layer between the support and the storage layer. Alternatively, the plane metal foil 21 may be replaced by a dielectric barrier, for example in the form of a ceramic foil.

The following example, which further illustrates and explains a particular embodiment of the invention, is given by way of example. It should be construed as illustrating the invention, and not as limiting it.

EXAMPLE

Figure 9:
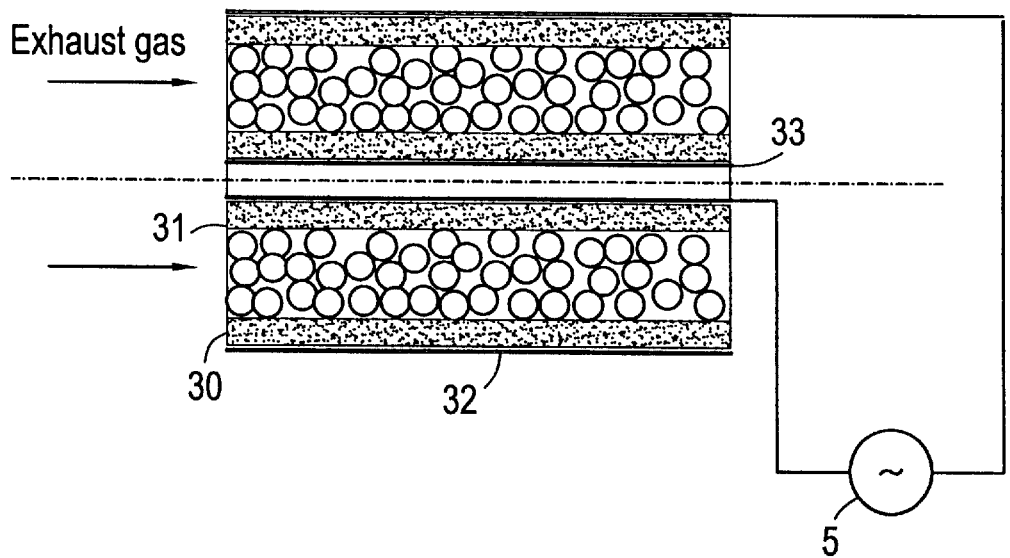
FIG. 9 illustrates a coaxial reactor with pellet packing for use in the process according to the invention.

FIG. 9 shows a coaxial plasma reactor. Reference number 30 denotes an outer tube and 31 an inner tube made of quartz glass. The inner surface of the inner tube and the outer surface of the outer tube are coated with metal electrodes 33 and 32, respectively. By applying a discharge voltage to these electrodes 32 and 33, a dielectric barrier discharge can be triggered in the annular space between the inner tube 31 and the outer tube 30.

This reactor was used for the following tests. The outer and inner tubes included 2 mm thick quartz glass. The outer tube had an external diameter of 4 cm and the inner tube had an internal diameter of 2.6 cm. The length of the reactor was 20 cm, and the length of the electrodes was 16 cm. The discharge was produced at a frequency of 1 kHz. The measurements were made at room temperature.

The synthesis gas mixture given in Table 1 was passed through the reactor. As a result of the water content of the mixture, the NO supplied was oxidized up to chemical equilibrium prior to entry into the plasma reactor.

TABLE 1

| Composition of the synthesis gas mixture | | |
|---|---|---|
| Substance | Volume flow [Nl] | Concentration [Vol. %] at T = 293 K |
| $N_2$ | 1.0 | 78 |
| $O_2$ | 0.2 | 19 |
| $H_2O$ | $26.0 \times 10^{-3}$ | 2.6 |
| NO | $1.2 \times 10^{-3}$ | 1000 vol.-ppm |
| Total | 1.2 | 100 |

To identify the species in the gas mixture, the absorption of the gas mixture in the range between 200 and 400 nm was measured using a UV-VIS spectrometer.

Figure 10A:
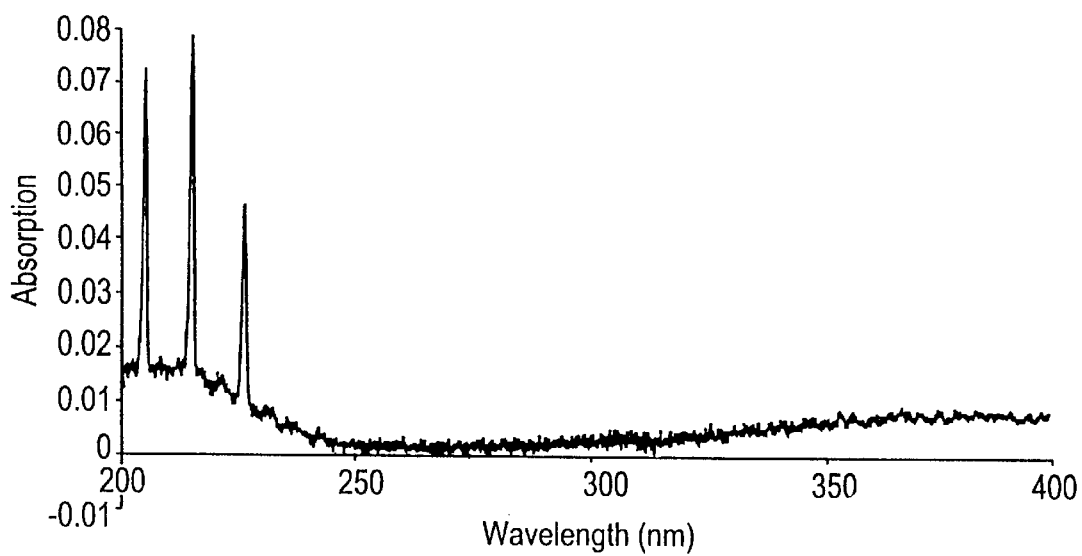
FIGS. 10a through 10c illustrate absorption spectra of an untreated synthesis gas mixture (FIG. 10a), a synthesis gas mixture after passage over barium oxide pellets (FIG. 10b), and a synthesis gas mixture after passage over barium oxide pellets with the gas discharge simultaneously switched on (FIG. 10c).

FIG. 10a shows the spectrum of the untreated gas mixture as it was passed into the reactor. This spectrum shows the characteristic absorption bands and lines of NO, $HNO_3$, and $NO_2$. The presence of NO is demonstrated by the three sharp absorption lines below 230 nm. A broad absorption band between 200 and about 250 nm is superimposed on these absorption lines, this band being assigned to nitric acid. Above 300 nm there is another very wide absorption band which is caused by $NO_2$.

Figure 10B:
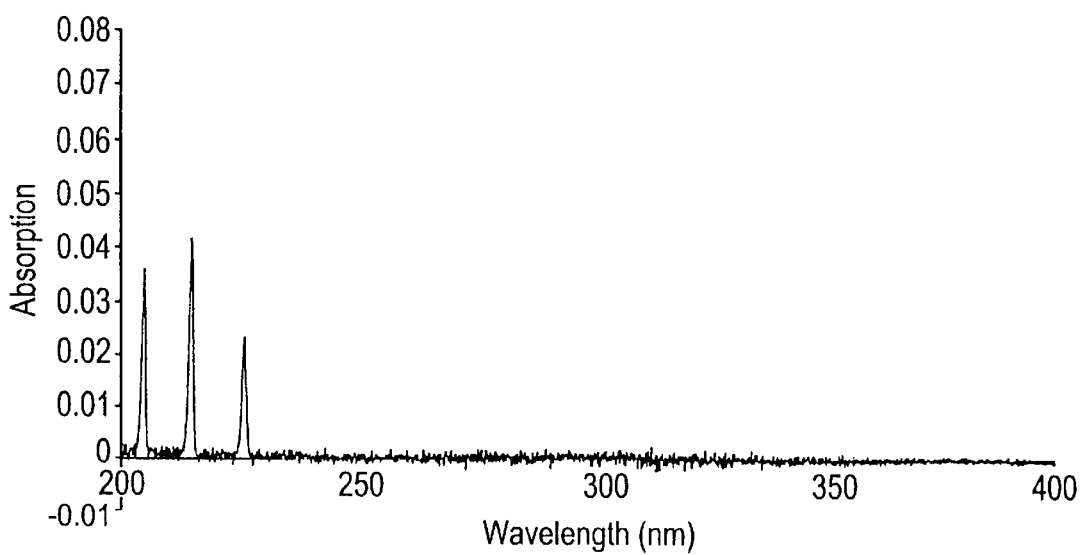

FIG. 10b shows the spectrum of the gas mixture after passing through the reactor filled with aluminum oxide pellets, but without switching on the gas discharge. The pellets contained barium oxide as a nitrogen oxides storage material at a concentration of 5 wt.%, with respect to the weight of the pellets. The diameter of the pellets was in the range from 1.5 to 2 mm. The spectrum in FIG. 10b shows that the pellets doped with barium oxide quantitatively absorbed both $NO_2$ and $HNO_3$.

Figure 10C:
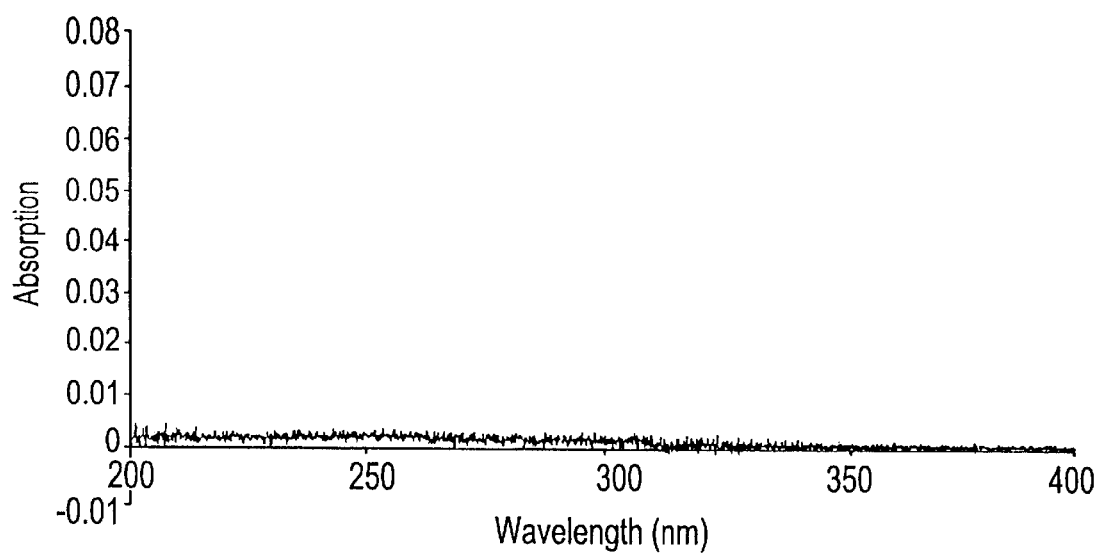

FIG. 10c shows the absorption spectrum of the gas mixture downstream of the reactor with the gas discharge switched on. Within the scope of the accuracy of measurement, oxidized nitrogen species could no longer be detected. The nitrogen oxide contained in the synthesis gas mixture was thus oxidized to $NO_2$ by the gas discharge and immediately absorbed by the pellets doped with barium oxide.

While the invention has been described herein in terms of various preferred embodiments and specific examples, those skilled in the art will recognize that various changes and modifications to the invention can be made without departing from the spirit and scope of the invention.

The priority application, German Patent Appln. No. 198 19 372.6, filed in Germany on Apr. 30, 1998, is relied upon and entirely incorporated herein by reference.

We claim:

1. A process for reducing a nitrogen oxides content of exhaust gas from an internal combustion engine, comprising: treating exhaust gas in an electric gas discharge such that at least one of nitrogen dioxide or nitric acid is formed from nitrogen oxides contained in the exhaust gas; storing the nitrogen dioxide or nitric acid as nitrates on a nitrogen oxides storage material during phases when the engine operates with greater than a stoichiometric air/fuel ratio, wherein the nitrogen oxides storage material is located within the gas discharge and is provided as a coating to walls of flow channels of a honeycomb structure, and the gas discharge is passed along the flow channels; decomposing the nitrates to nitrogen oxides during phases when the engine operates with less than the stoichiometric air/fuel ratio; and reducing the nitrogen oxides that are released from the storage material to nitrogen.

2. A process according to claim 1, wherein the exhaust gas is passed over an exhaust gas catalyst after leaving the gas discharge.

3. A process according to claim 1, wherein the nitrogen oxides storage material includes at least one platinum group metal or at least one first series transition metal as a catalytically active component.

4. A process according to claim 1, wherein the gas discharge is operated continuously during storing and decomposing.

5. A process according to claim 4, wherein the gas discharge is a dielectric barrier discharge operated at a frequency between 50 Hz and 250 Hz.

6. A process according to claim 4, wherein at least one of a starter catalyst or a hydrocarbon absorber is provided upstream of the nitrogen oxides storage material with respect to a direction of exhaust gas flow.

7. A process for reducing a nitrogen oxides content of exhaust gas from an internal combustion engine, comprising: treating exhaust gas in an electric gas discharge such that at least one of nitrogen dioxide or nitric acid is formed from nitrogen oxides contained in the exhaust gas; storing the nitrogen dioxide or nitric acid as nitrates on a nitrogen oxides storage material during phases when the engine operates with greater than a stoichiometric air/fuel ratio, wherein the nitrogen oxides storage material is located within the gas discharge and is provided as a coating to walls of flow channels of a honeycomb structure, and the gas discharge is applied transverse to flow of the exhaust gas; decomposing the nitrates to nitrogen oxides during phases when the engine operates with less than the stoichiometric air/fuel ratio; and reducing the nitrogen oxides that are released from the storage material to nitrogen.

8. A process according to claim 7, wherein a dielectric intermediate layer is arranged between the walls of the honeycomb structure and the nitrogen oxides storage material.

9. A process according to claim 7, wherein the exhaust gas is passed over an exhaust gas catalyst after leaving the gas discharge.

10. A process according to claim 7, wherein the nitrogen oxides storage material includes at least one platinum group metal or at least one first series transition metal as a catalytically active component.

11. A process according to claim 7, wherein the gas discharge is operated continuously during storing and decomposing.

12. A process according to claim 11, wherein the gas discharge is a dielectric barrier discharge operated at a frequency between 50 Hz and 250 kHz.

13. A process according to claim 11, wherein at least one of a starter catalyst or a hydrocarbon adsorber is provided upstream of the nitrogen oxides storage material with respect to a direction of exhaust gas flow.

14. A process for reducing a nitrogen oxides content of exhaust gas from an internal combustion engine, comprising: treating exhaust gas in an electric gas discharge such that at least one of nitrogen dioxide or nitric acid is formed from nitrogen oxides contained in the exhaust gas, wherein the electric gas discharge is a dielectric barrier discharge; storing the nitrogen dioxide or nitric acid as nitrates on a nitrogen oxides storage material during phases when the engine operates with greater than a stoichiometric air/fuel ratio, wherein the nitrogen oxides storage material is arranged within the barrier discharge in such a way that the discharge is substantially running over the surface of said storage material; decomposing the nitrates to nitrogen oxides during phases when the engine operates with less than the stoichiometric air/fuel ratio; and reducing the nitrogen oxides that are released from the storage material to nitrogen.

15. A process according to claim 14, wherein said nitrogen oxides storage material is in the form of pellets.

16. A process according to claim 15, wherein the nitrogen oxides storage material includes at least one platinum group metal or at least one first series transition metal as a catalytically active component.

17. A process according to claim 15, wherein the exhaust gas is passed over an exhaust gas catalyst after leaving the gas discharge.

18. A process according to claim 17, wherein the nitrogen oxides storage material includes at least one platinum group metal or at least one first series transition metal as a catalytically active component.

19. A process according to claim 14, wherein at least one of a starter catalyst or a hydrocarbon adsorber is provided upstream of the dielectric barrier discharge with respect to a direction of the exhaust gas flow.

* * * * *